United States Patent
Waldschmidt et al.

(10) Patent No.: US 8,266,917 B2
(45) Date of Patent: Sep. 18, 2012

(54) MULTI TEMPERATURE CONTROL SYSTEM

(75) Inventors: William L. Waldschmidt, Randolph, MN (US); Timothy J. Neu, Saint Paul Park, MN (US); Dean M. Parker, Eden Prairie, MN (US)

(73) Assignee: Thermo King Corporation, Minneapolis, MN (US)

( * ) Notice: Subject to any disclaimer, the term of this patent is extended or adjusted under 35 U.S.C. 154(b) by 679 days.

(21) Appl. No.: 12/512,476

(22) Filed: Jul. 30, 2009

(65) Prior Publication Data

US 2010/0024450 A1 Feb. 4, 2010

Related U.S. Application Data

(60) Provisional application No. 61/085,551, filed on Aug. 1, 2008.

(51) Int. Cl.
*F25D 1/00* (2006.01)
(52) U.S. Cl. ............................................. 62/115
(58) Field of Classification Search ............... 62/115, 62/457.9, 498, 239
See application file for complete search history.

(56) References Cited

U.S. PATENT DOCUMENTS

| | | | |
|---|---|---|---|
| 3,411,320 A * | 11/1968 | Smith et al. | 62/505 |
| 4,966,010 A | 10/1990 | Jaster et al. | |
| 5,029,450 A | 7/1991 | Takano et al. | |
| 5,184,473 A | 2/1993 | Day | |
| 5,222,373 A * | 6/1993 | Waldschmidt | 62/239 |
| 5,415,014 A * | 5/1995 | Waldschmidt et al. | 62/509 |
| 5,867,995 A | 2/1999 | Lewis | |
| 6,289,684 B1 | 9/2001 | Guidry, II et al. | |
| 6,467,293 B1 | 10/2002 | Goosman | |
| 7,134,294 B2 | 11/2006 | Singh et al. | |
| 2003/0196445 A1 | 10/2003 | Cho et al. | |
| 2008/0289354 A1 | 11/2008 | Dudley et al. | |

FOREIGN PATENT DOCUMENTS

| | | |
|---|---|---|
| EP | 1318038 A1 | 6/2003 |
| JP | 2001108345 A | 4/2001 |
| WO | 88002705 A1 | 4/1988 |

OTHER PUBLICATIONS

William L. Waldschmidt, admitted prior art: Evaporator Pressure Regulator Used in a Transport Refrigeration Unit, dated Feb. 16, 2010.

* cited by examiner

*Primary Examiner* — Melvin Jones
(74) *Attorney, Agent, or Firm* — Michael Best & Friedrich LLP

(57) ABSTRACT

An environmentally controlled shipping container including a storage space, a first environmentally controlled space within the storage space, a second environmentally controlled space within the storage space, and a transport refrigeration unit. The transport refrigeration unit including a compressor that provides a flow of refrigerant, a condenser that receives the flow of refrigerant from the compressor, a first evaporator positioned within the first environmentally controlled space and in fluid communication with the condenser, a second evaporator positioned within the second environmentally controlled space and in fluid communication with the condenser, and a pressure regulator associated with the first evaporator. The pressure regulator selectively restricts the flow of refrigerant from the first evaporator to the compressor such that the flow of refrigerant from the first evaporator to the compressor is substantially equal to the flow of refrigerant from the second evaporator to the compressor.

19 Claims, 2 Drawing Sheets

MULTI TEMPERATURE CONTROL SYSTEM

CROSS REFERENCE TO RELATED APPLICATIONS

This patent application claims priority to U.S. Provisional Patent Application Ser. No. 61/085,551 filed Aug. 1, 2008, the entire contents of which are hereby incorporated by reference.

BACKGROUND

The present invention relates to multi temperature refrigeration systems. Particularly, the invention relates to transport refrigeration units that maintain multiple temperature zones within the same cargo space.

SUMMARY

In one embodiment, the invention provides a storage space, a refrigeration system in fluid communication with a first temperature controlled space and a second temperature controlled space of the storage space. The refrigeration system includes a compressor, a condenser, a first evaporator disposed within the first temperature controlled space, a second evaporator disposed within the second temperature controlled space, and an evaporator equalizer associated with the first evaporator to balance the suction pressures of the first and second evaporators thereby substantially equalizing the cooling capacity of the first and second evaporators.

In another embodiment, the invention provides an environmentally controlled shipping container that includes a storage space, a first environmentally controlled space within the storage space, a second environmentally controlled space within the storage space, the second environmentally controlled space environmentally separate from the first environmentally controlled space, and a transport refrigeration unit. The transport refrigeration unit includes a compressor that provides a flow of refrigerant, a condenser that receives the flow of refrigerant from the compressor, a first evaporator positioned within the first environmentally controlled space and in fluid communication with the condenser such that the first evaporator receives at least a portion of the flow of refrigerant from the condenser, a second evaporator positioned within the second environmentally controlled space and in fluid communication with the condenser such that the second evaporator receives at least a portion of the flow of refrigerant from the condenser, and a pressure regulator associated with the first evaporator. The pressure regulator selectively restricts the flow of refrigerant from the first evaporator to the compressor such that the flow of refrigerant from the first evaporator to the compressor is substantially equal to the flow of refrigerant from the second evaporator to the compressor.

In another embodiment, the invention provides a transport refrigeration unit that includes a prime mover, a compressor powered by the prime mover to provide a flow of refrigerant, and a condenser that receives the flow of refrigerant from the compressor. A manifold receives the flow of refrigerant from the condenser and splits the flow of refrigerant into a first refrigerant flow and a second refrigerant flow. A first evaporator is in fluid communication with the condenser such that the first evaporator receives the first refrigerant flow from the manifold, and defines a first pressure of the first refrigerant flow after the first refrigerant flow exits the first evaporator. A second evaporator is in fluid communication with the condenser such that the second evaporator receives the second flow of refrigerant from the manifold, and defines a second pressure of the second refrigerant flow after the second refrigerant flow exits the second evaporator toward the compressor. An evaporator equalizer is in fluid communication between the first evaporator and the compressor such that the evaporator equalizer receives the first refrigerant flow at the first pressure from the first evaporator, and discharges the first refrigerant flow at a third pressure substantially equal to the second pressure.

In another embodiment, the invention provides a method of operating a transport refrigeration unit for a shipping container that includes a storage space, a first environmentally controlled space within the storage space, and a second environmentally controlled space, environmentally separate from the first environmentally controlled space, disposed within the storage space. The method including the steps of setting a first set point temperature for the first environmentally controlled space, setting a second set point temperature for the second environmentally controlled space, compressing a refrigerant with a compressor to produce a flow of refrigerant, condensing the flow of refrigerant in a condenser, closing a first valve to inhibit the flow of refrigerant from flowing through a first evaporator positioned within the first environmentally controlled space, opening a second valve to allow the flow of refrigerant to flow to a second evaporator positioned within the second environmentally controlled space, cooling the second environmentally controlled space with the second evaporator until the temperature within the second environmentally controlled space is substantially equal to the first set point temperature, recording a pressure at an outlet of the second evaporator when the temperature within the second environmentally controlled space is substantially equal to the first set point temperature, and setting a pressure regulator positioned between the outlet of the first evaporator and the compressor to the recorded pressure.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
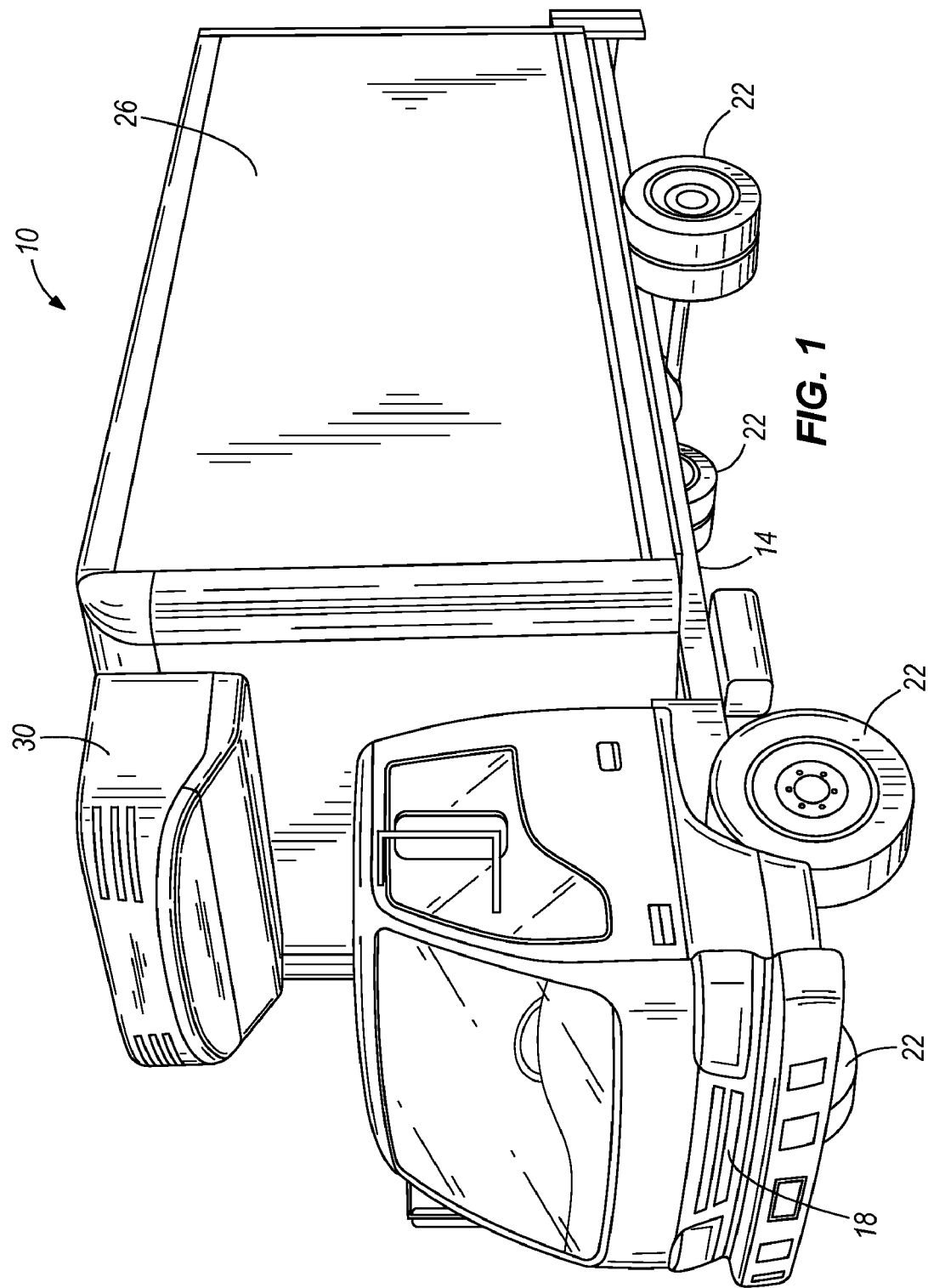
FIG. 1 is a perspective view of a vehicle that includes a refrigeration system according to the invention.

FIG. 1 shows a vehicle 10 that includes a frame 14, an engine 18 mounted to the frame 14, front and rear wheels 22 mounted to the frame 14 and supporting the vehicle 10 for movement, and a cargo or storage space 26 coupled to the frame 14. The illustrated vehicle 10 is a truck for the transport of temperature sensitive goods and the storage space 26 is an environmentally controlled shipping container directly connected to the frame 14. In other embodiments, the vehicle 10 could be a semi tractor and the environmentally controlled shipping container could be a trailer that is coupled to the vehicle with a yoke. Other environmentally controlled shipping containers may include ocean shipping containers, railroad containers, airline containers, or another storage space, as desired.

Figure 2:
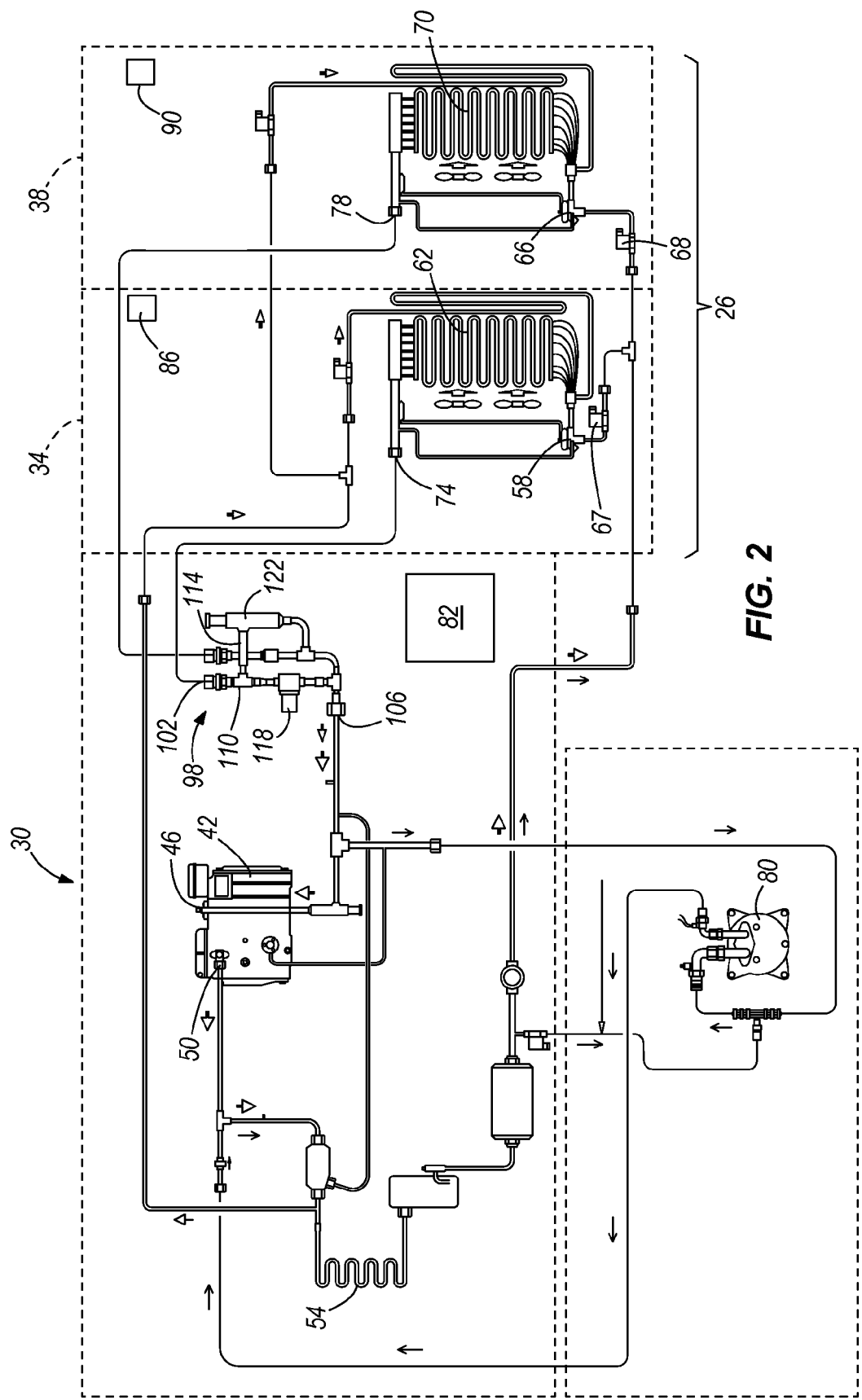
FIG. 2 is a schematic representation of the refrigeration system of FIG. 1.

A refrigeration system 30 (e.g., a transport refrigeration unit or TRU) is mounted to the storage space 26 and conditions the air within the storage space 26 such that a desired temperature is maintained. FIG. 2 schematically represents the storage space 26 and the refrigeration system 30. The storage space 26 includes a first temperature controlled space 34 and a second temperature controlled space 38. In the illustrated embodiment, the first temperature controlled space 34 is maintained at a first temperature that is within the fresh temperature range (e.g., between 33° F. and 50° F.) and the second temperature controlled space 38 is maintained at a second temperature, different from the first temperature, that is within the frozen temperature range (e.g., between 31° F. and −20° F.). For example, with this arrangement, frozen foods may be transported in the second temperature controlled space 38 while fresh produce may be transported in the first temperature controlled space 34. The refrigeration system 30 maintains predetermined temperatures, or temperature ranges, within the first and second temperature controlled spaces 34, 38. In other embodiments, the first and second temperatures may be the same. In addition, the first temperature controlled space 34 may be a first environmentally controlled space and the second temperature controlled space 38 may be a second environmentally controlled space such that other parameters (e.g., humidity, etc.) may be controlled.

The refrigeration system 30 includes a compressor 42 with a suction port 46 and an outlet 50, a condenser 54, a first expansion valve 58 and a first evaporator 62 positioned in the first temperature controlled space 34, and a second expansion valve 66 and a second evaporator 70 positioned in the second temperature controlled space 38. The compressor 42 compresses liquid refrigerant and produces a flow of refrigerant that is directed to the condenser 54. After the condenser 54, the refrigerant flows in a parallel circuit to both the first expansion valve 58 and the second expansion valve 66. A first valve 67 (e.g., a liquid line solenoid valve) is positioned between the first expansion valve 58 and the condenser 54 and a second valve 68 (e.g., a liquid line solenoid valve) is positioned between the second expansion valve 66 and the condenser 54. The first and second valves 67, 68 act as a manifold and are actuated between an open position and a closed position to selectively provide refrigerant to the first expansion valve 58 and the second expansion valve 62. The first expansion valve 58 feeds the first evaporator 62 that includes a first evaporator outlet 74 and the second expansion valve 66 feeds the second evaporator 70 that includes a second evaporator outlet 78. Fluid discharged from the first evaporator outlet 74 and the second evaporator outlet 78 is combined before entering the suction port 46 of the compressor 42. In the illustrated embodiment, the compressor 42 and condenser 54 act as common components for both the first temperature controlled space 34 and the second temperature controlled space 38.

The illustrated refrigeration system 30 includes a truck engine compressor 80 that operates in place of the compressor 42 during an On Road Cool Mode when the truck engine is running (i.e., in On Road Cool Mode, the truck engine (not shown) operates as the prime mover to operate the truck engine compressor 80). Alternatively, the compressor 42 operates during a Standby Cool Mode when the truck engine is not running (i.e., at any time when the truck engine is not running the engine 10 is the prime mover). In addition, any combination of the truck engine and the engine 10 may be used as the prime mover to power the refrigeration system 30. The refrigeration system 30 may also includes other components (e.g., a dryer, a receiver, an oil separators) that are not discussed in detail herein.

The refrigeration system 30 also includes a controller 82, a first sensor 86 positioned within the first temperature controlled space 34, and a second sensor 90 positioned within the second temperature controlled space 38. The first sensor 86 and the second sensor 90 send signals to the controller 82 that are indicative of the temperature within the corresponding temperature controlled space 34, 38. The controller 82 receives the signals and determines if more or less cooling is required within each temperature controlled space 34, 38 based on comparisons between a representative signal and a corresponding user-programmed set-point or temperature range. The controller 82 communicates with the compressor 42, the first valve 67, the second valve 68, and/or other components of the refrigeration system 30 to control the temperature within the temperature controlled spaces 34, 38, as desired.

With continued reference to FIG. 2, an evaporator equalizer 98 is positioned between the first evaporator outlet 74 and the compressor 42 suction port 46. The evaporator equalizer 98 includes an inlet 102, an outlet 106, a first branch 110, and a second branch 114. The inlet 102 is fluidly connected to the first evaporator outlet 74, and the outlet 106 is fluidly connected to the compressor 42 suction port 46. A solenoid valve 118 is disposed in the first branch 110 and a suction pressure regulator 122 is disposed in the second branch 114. The solenoid valve 118 is in electrical communication with the controller 82. The solenoid valve 118 is a normally open valve and is actuated between an open position wherein refrigerant flows through the first branch 110 to form a bypass of the suction pressure regulator 122, and a closed position wherein refrigerant is inhibited from flowing through the first branch 110. The controller 82 controls the position of the solenoid valve 118 such that the desired temperature is maintained within the temperature controlled spaces 34, 38.

The operation of the refrigeration system 30 will be described below with reference to FIG. 2. Prior to normal operation of the refrigeration system 30, the system 30 undergoes a set-up procedure to determine and set the suction pressure set-point of the suction pressure regulator 122. The set-up procedure begins during a pull-down operation in which, for example, the storage space 26 is at ambient temperature and a user has entered the first temperature and/or temperature range for the first temperature controlled space 34 (e.g., a fresh range temperature) and the second temperature and/or temperature range for the second temperature controlled space 38 (e.g., a frozen range temperature) into the controller 82. The controller 82 then actuates the first valve 67 to the closed position and the second valve 68 to the open position such that refrigerant flows through the second evaporator 70 and lowers the temperature within the second temperature controlled space 38. When the temperature within the second temperature controlled space 38 reaches the second temperature (i.e., the set-point temperature for the second temperature controlled space 34) or within at least 5 degrees Fahrenheit of the second temperature as sensed by the second sensor 90, a technician records a pressure within the second evaporator outlet 78 (e.g., as read on a suction pressure gauge of the operating compressor 42, 80).

The technician then manipulates the temperature set points such that the controller 82 actuates the second valve 68 to the closed position and the first valve 67 to the open position. Then, the technician manually closes the solenoid valve 118 and the temperature within the first temperature controlled space 34 is lowered. When the temperature within the first temperature controlled space 34 as sensed by the first sensor 86 reaches the first temperature or within at least 5 degrees Fahrenheit of the first temperature, the suction pressure regulator 122 of the evaporator equalizer 98 is manually adjusted (e.g., with an Allen wrench) until the suction pressure (as read on a suction pressure gauge of the operating compressor 42, 80) equals the pressure previously recorded by the technician. After the evaporator equalizer 98 is adjusted, any setup gauges or other tools are removed from the refrigeration system 30 and setup procedure is complete.

After the setup procedure is completed and normal operation begins, the controller 82 closes or maintains the solenoid valve 118 closed whenever the temperature within the second temperature controlled space 38 is above the second temperature regardless of the temperature within the first temperature controlled space 34 such that in the case where refrigerant is being directed to both evaporators 62, 70 (i.e., the first and second valves 67, 68 are in the open position) the pressure in the first evaporator outlet 74 is equal to the pressure within the second evaporator outlet 78. When the first and second valves 67, 68 are open and the solenoid valve 118 is closed, the first evaporator 62 and the second evaporator 70 receive about the same amount of refrigerant and therefore cool the first temperature controlled space 34 and the second temperature controlled space 38 substantially simultaneously. In some embodiments, the second evaporator 70 receives slightly more refrigerant than the first evaporator 62. When the first temperature controlled space 34 reaches the first temperature, the first valve 67 is closed such that all the refrigerant is routed to the second evaporator 70 and the second temperature controlled space 38 is pulled down to the second temperature. If the second temperature controlled space 38 reaches the second temperature before the first temperature controlled space 34 reaches the first temperature, the second valve 68 is closed and the solenoid valve 118 is opened such that all the refrigerant is routed to the first evaporator 62 and the first temperature controlled space 34 is pulled down to the first temperature. When the temperature is acceptable within both the first temperature controlled space 34 and the second temperature controlled space 38, the first and second valves 67, 68 are closed or the compressor 42 is shut down.

During regular operation, the controller 82 monitors the temperature within the storage space 26 with the first sensor 86 and the second sensor 90. If the temperature within first temperature controlled space 34 is above the desired range and the temperature within second temperature controlled space 38 is acceptable, then the first valve 67 is actuated to the open position, the second valve 68 is maintained in the closed position, and the first evaporator 62 cools the first temperature controlled space 34 to the first temperature. When the second temperature controlled space 38 is not demanding cooling, the solenoid valve 118 is in the open position such that the full flow of refrigerant is supplied to the first evaporator 62.

If the temperature within first temperature controlled space 34 is acceptable and the temperature within second temperature controlled space 38 is above the acceptable range, then the first valve 67 is actuated to the closed position, the second valve 68 is actuated to the open position, and the second evaporator 70 receives the full flow of refrigerant such that the second temperature controlled space 38 is cooled to the second temperature.

If the temperature within first temperature controlled space 34 is above the desired range and the temperature within second temperature controlled space 38 is above the desired range, then the first valve 67 and the second valve 68 are actuated to the open position. The solenoid valve 118 is actuated to the closed position because the second temperature controlled space 38 is demanding cooling. When the solenoid valve 118 is closed the pressure within the first evaporator outlet 74 is maintained substantially equal to the pressure within the second evaporator outlet 78 by the suction pressure regulator 122 and both the first evaporator 62 and the second evaporator 70 cool the storage space 26. The refrigeration system 30 continues to cool in this manner until either the first temperature controlled space 34 reaches the first temperature or the second temperature controlled space 38 reaches the second temperature, at which time the refrigeration system 30 will continue to cool the out-of-range temperature controlled space 34, 38 as described above.

Prior art systems without the evaporator equalizer 98 and corresponding control system were disadvantageous because during a time when both the first and second temperature controlled spaces 34, 38 were demanding cooling, the higher temperature space (e.g., fresh range space) would have the priority. The evaporator positioned in the higher temperature space would have a significantly higher pressure in the evaporator outlet such that most, if not all, the refrigerant would be supplied to the higher temperature evaporator. In this situation, significant warming could occur in the colder temperature space (e.g., frozen range space) before the system would be able to route refrigerant to the colder temperature evaporator. By the addition of the evaporator equalizer of the present invention, both the evaporators of the higher and lower temperature spaces provide substantially balanced cooling until one of the temperature controlled spaces reaches its set point temperature.

In the illustrated embodiment, the first temperature controlled space 34 is a dedicated fresh range space and the second temperature controlled space 38 is a dedicated frozen range space. Tin other embodiments, each of the first and second temperature controlled spaces 34, 38 can interchangeably be used as either a fresh range space or a frozen range space. However, in these other embodiments, a second evaporator equalizer must be added to the suction line (i.e., connected between the second evaporator outlet 78 and the compressor 42) of the second evaporator 70. Either the first or second evaporator equalizer will function as described above depending upon whether the first temperature controlled space 34 is the fresh range space or the frozen range space (and conversely, whether the second temperature controlled space 38 is the frozen range space or fresh range space, respectively). For example, if the first temperature controlled space 34 is the fresh range space and the second temperature controlled space 38 is the frozen space, then the first evaporator equalizer 98 will function as described above and a solenoid valve (corresponding to valve 118 of the first evaporator equalizer 98) of the second equalizer will be open. Likewise, if the first temperature controlled space 34 is the frozen range space and the second temperature controlled space 38 is the fresh range space, then the second evaporator equalizer will function as described above and the solenoid valve 118 of the first evaporator equalizer 98 will be open.

What is claimed is:

1. An environmentally controlled shipping container comprising:
    a storage space;
    a first environmentally controlled space within the storage space;
    a second environmentally controlled space within the storage space, the second environmentally controlled space environmentally separate from the first environmentally controlled space; and
    a transport refrigeration unit including:
        a compressor that provides a flow of refrigerant;
        a condenser that receives the flow of refrigerant from the compressor;
        a first evaporator positioned within the first environmentally controlled space and in fluid communication with the condenser such that the first evaporator receives at least a portion of the flow of refrigerant from the condenser;
        a second evaporator positioned within the second environmentally controlled space and in fluid communication between the condenser and the compressor such that the second evaporator receives at least a portion of the flow of refrigerant from the condenser and discharges at least a portion of the flow of refrigerant to the compressor; and
        a pressure regulator in fluid communication associated with the first evaporator, the pressure regulator selectively restricting the flow of refrigerant from the first evaporator to the compressor such that the flow of refrigerant from the first evaporator to the compressor is substantially equal to the flow of refrigerant from the second evaporator to the compressor.

2. The environmentally controlled shipping container of claim 1, the transport refrigeration unit further including a first valve positioned between the condenser and the first evaporator, the controller in communication with the first valve and operable to move the first valve between an open position and a closed position to selectively provide the portion of the flow of refrigerant to the first evaporator.

3. The environmentally controlled shipping container of claim 2, wherein the transport refrigeration unit further includes a second valve positioned between the condenser and the second evaporator, the controller in communication with the second valve and operable to move the second valve between an open position and a closed position to selectively provide the portion of the flow of refrigerant to the second evaporator.

4. The environmentally controlled shipping container of claim 1, wherein the pressure regulator is adjustable to restrict the flow of refrigerant through the first evaporator such that a pressure of refrigerant leaving the first evaporator is substantially equal to a pressure of refrigerant exiting the second evaporator.

5. The environmentally controlled shipping container of claim 1, wherein the transport refrigeration unit further includes a bypass between the first evaporator and the compressor such that the portion of the flow of refrigerant through the first evaporator may circumvent the pressure regulator.

6. The environmentally controlled shipping container of claim 5, wherein the transport refrigeration unit further includes a solenoid-operated valve positioned in the bypass, the solenoid-operated valve moveable between an open position and a closed position to selectively allow the portion of the flow of refrigerant through the first evaporator to pass through the bypass.

7. The environmentally controlled shipping container of claim 1, wherein the first environmentally controlled space is maintained at a fresh range temperature and the second environmentally controlled space is maintained at a frozen range temperature.

8. The environmentally controlled shipping container of claim 7, wherein the pressure regulator is adjustable such that the second environmentally controlled space has one of an equal and a higher cooling priority than the first environmentally controlled space.

9. A transport refrigeration unit comprising:
    a prime mover;
    a compressor powered by the prime mover to provide a flow of refrigerant;
    a condenser that receives the flow of refrigerant from the compressor;
    a manifold that receives the flow of refrigerant from the condenser and splits the flow of refrigerant into a first refrigerant flow and a second refrigerant flow;
    a first evaporator in fluid communication with the condenser such that the first evaporator receives the first refrigerant flow from the manifold, the first evaporator defining a first pressure of the first refrigerant flow after the first refrigerant flow exits the first evaporator;
    a second evaporator in fluid communication with the condenser such that the second evaporator receives the second flow of refrigerant from the manifold, the second evaporator defining a second pressure of the second refrigerant flow after the second refrigerant flow exits the second evaporator toward the compressor; and
    an evaporator equalizer in fluid communication between the first evaporator and the compressor such that the evaporator equalizer receives the first refrigerant flow at the first pressure from the first evaporator, and discharges the first refrigerant flow at a third pressure substantially equal to the second pressure.

10. The transport refrigeration unit of claim 9, further comprising a first valve positioned between the first evaporator and the manifold, the first valve movable between an open position and a closed position to selectively provide the first refrigerant flow to the first evaporator.

11. The transport refrigeration unit of claim 9, further comprising a second valve positioned between the second evaporator and the manifold, the second valve movable between an open position and a closed position to selectively provide the second flow of refrigerant to the second evaporator.

12. The transport refrigeration unit of claim 9, wherein the evaporator equalizer includes:
    a first refrigerant flow branch supplying the first refrigerant flow from the first evaporator to the compressor;
    an electrically actuated solenoid valve positioned in the first refrigerant flow branch and movable between an open position wherein refrigerant flows therethrough, and a closed position wherein the first refrigerant flow is inhibited;
    a second refrigerant flow branch supplying the first refrigerant flow from the first evaporator to the compressor; and
    a pressure regulator positioned in the second refrigerant flow branch.

13. The transport refrigeration unit of claim 9, further comprising:
    a first valve positioned between the first evaporator and the manifold, the first valve movable between an open position and a closed position to selectively provide the first refrigerant flow to the first evaporator;

a second valve positioned between the second evaporator and the manifold, the second valve movable between an open position and a closed position to selectively provide the second flow of refrigerant to the second evaporator; and a controller in communication with and controlling the operation of the compressor, the first valve, and the second valve.

14. A method of operating a transport refrigeration unit for a shipping container that includes a storage space, a first environmentally controlled space within the storage space, and a second environmentally controlled space within the storage space, the second environmentally controlled space environmentally separate from the first environmentally controlled space, the method including the steps of:

setting a first set point temperature for the first environmentally controlled space;

setting a second set point temperature for the second environmentally controlled space;

compressing a refrigerant with a compressor to produce a flow of refrigerant;

condensing the flow of refrigerant in a condenser;

closing a first valve to inhibit the flow of refrigerant from flowing through a first evaporator positioned within the first environmentally controlled space;

opening a second valve to allow the flow of refrigerant to flow to a second evaporator positioned within the second environmentally controlled space;

cooling the second environmentally controlled space with the second evaporator until the temperature within the second environmentally controlled space is substantially equal to the second set point temperature;

recording a pressure at an outlet of the second evaporator when the temperature within the second environmentally controlled space is substantially equal to the second set point temperature; and setting a pressure regulator positioned between the outlet of the first evaporator and the compressor to the recorded pressure.

15. The method of claim 14, further comprising:

closing the second valve to inhibit the flow of refrigerant from flowing through the second evaporator;

opening the first valve to allow the flow of refrigerant to flow to the first evaporator;

opening a solenoid valve positioned between an outlet of the first evaporator and the compressor such that substantially the entire flow of refrigerant passes through the first evaporator; and cooling the first environmentally controlled space with the first evaporator until the temperature within the first environmentally controlled space is substantially equal to the first set point temperature.

16. The method of claim 14, further comprising:

closing the first valve for a second time to inhibit the flow of refrigerant through the first evaporator;

opening the second valve for a second time to allow the flow of refrigerant to flow through the second evaporator; and cooling the second environmentally controlled space with the second evaporator until the temperature within the second environmentally controlled space is substantially equal to the second set point temperature.

17. The method of claim 14, further comprising:

sensing that the temperature within the first temperature controlled space is significantly greater than the first set point temperature;

opening the first valve to allow the flow of refrigerant to flow through the first evaporator; and cooling the first environmentally controlled space with the first evaporator until the temperature within the first environmentally controlled space is substantially equal to the first set point temperature.

18. The method of claim 14, further comprising:

sensing that the temperature within the second temperature controlled space is significantly greater than the second set point temperature;

opening the second valve for a second time to allow the flow of refrigerant to flow through the second evaporator; and cooling the second environmentally controlled space with the second evaporator until the temperature within the second environmentally controlled space is substantially equal to the second set point temperature.

19. The method of claim 14, further comprising:

sensing that the temperature within the first temperature controlled space is significantly greater than the first set point temperature;

sensing that the temperature within the second temperature controlled space is significantly greater than the second set point temperature;

closing a solenoid valve positioned between an outlet of the first evaporator and the compressor when the temperature within the second temperature controlled space is significantly greater than the second set point temperature;

opening the first valve to provide the flow of refrigerant to the first evaporator; and regulating the pressure at the outlet of the first evaporator with the pressure regulator such that the first evaporator and the second evaporator provide substantially equal cooling to the first environmentally controlled space and the second environmentally controlled space.

* * * * *